United States Patent
Wang et al.

(10) Patent No.: US 10,701,674 B2
(45) Date of Patent: *Jun. 30, 2020

(54) METHOD AND APPARATUS FOR REPORTING FEEDBACK INFORMATION FOR MULTI-CARRIER OPERATION

(71) Applicant: INTERDIGITAL PATENT HOLDINGS, INC., Wilmington, DE (US)

(72) Inventors: Lei Wang, San Diego, CA (US); Eldad M. Zeira, Huntington, NY (US); Ronald Murias, Calgary (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,516

(22) Filed: Apr. 10, 2019

(65) Prior Publication Data
US 2019/0239218 A1     Aug. 1, 2019

Related U.S. Application Data

(63) Continuation of application No. 15/042,907, filed on Feb. 12, 2016, now Pat. No. 10,285,164, which is a
(Continued)

(51) Int. Cl.
*H04W 72/04* (2009.01)
*H04L 5/02* (2006.01)
(Continued)

(52) U.S. Cl.
CPC ....... *H04W 72/0413* (2013.01); *H04L 1/0026* (2013.01); *H04L 1/0028* (2013.01); *H04L 1/1861* (2013.01); *H04L 5/02* (2013.01)

(58) Field of Classification Search
CPC .... H04W 72/0413; H04L 5/02; H04L 1/0028; H04L 1/1861; H04L 1/0026
See application file for complete search history.

(56) References Cited

U.S. PATENT DOCUMENTS 6,587,444 B1   7/2003   Lenzo et al.
6,788,661 B1   9/2004   Ylitalo et al.
(Continued)

FOREIGN PATENT DOCUMENTS

WO   06/104573   10/2006
WO   06/116102   11/2006
(Continued)

OTHER PUBLICATIONS

Huawei, "PUCCH design for carrier aggregation," 3GPP TSG RAN WG1 Meeting #56, R1-090813, Athens, Greece (Feb. 9-13, 2009).
(Continued)

*Primary Examiner* — Rasheed Gidado
(74) *Attorney, Agent, or Firm* — Volpe and Koenig, P.C.

(57) ABSTRACT

Method and apparatus for reporting feedback information are disclosed. A wireless transmit/receive unit (WTRU) may receive an allocation message which indicates an allocation of downlink resources for a downlink transmission and an allocation of a first uplink control channel. Further, the indicated allocation of the first uplink control channel may indicate a starting symbol for the first uplink control channel and subcarriers for the first uplink control channel. Also, the WTRU may receive the downlink transmission on a downlink carrier in the indicated allocation of downlink resources for the downlink transmission. Moreover, the WTRU may transmit a plurality of uplink control channels carrying hybrid automatic repeat request (HARQ) acknowledgment/negative-acknowledgement (ACK/NACK) information for the downlink transmission and other control information. In
(Continued)

addition, the plurality of uplink control channels may include the first uplink control channel.

15 Claims, 7 Drawing Sheets

Related U.S. Application Data continuation of application No. 12/868,214, filed on Aug. 25, 2010, now Pat. No. 9,264,177.

(60) Provisional application No. 61/236,912, filed on Aug. 26, 2009.

(51) Int. Cl.
*H04L 1/18* (2006.01)
*H04L 1/00* (2006.01)

(56) References Cited

U.S. PATENT DOCUMENTS

| | | | |
|---|---|---|---|
| 7,330,700 | B2 | 2/2008 | Aizawa |
| 7,548,759 | B2 | 6/2009 | Kim et al. |
| 7,567,639 | B2 | 7/2009 | Huh et al. |
| 7,684,762 | B2 | 3/2010 | Ihm et al. |
| 7,693,125 | B2 | 4/2010 | Ihm et al. |
| 8,347,164 | B2 | 1/2013 | Lee et al. |
| 8,553,635 | B2 * | 10/2013 | Ahn ............... H04L 1/1812 370/329 |
| 2003/0109284 | A1 | 6/2003 | Akerberg et al. |
| 2006/0274712 | A1 | 12/2006 | Malladi et al. |
| 2008/0209301 | A1 | 8/2008 | Chang et al. |
| 2008/0212506 | A1 * | 9/2008 | Lee ............... H04W 72/042 370/310 |
| 2008/0253336 | A1 | 10/2008 | Parkvall et al. |
| 2008/0268785 | A1 | 10/2008 | McCoy et al. |
| 2009/0186613 | A1 | 7/2009 | Ahn et al. |
| 2009/0196240 | A1 | 8/2009 | Frederiksen et al. |
| 2009/0274120 | A1 | 11/2009 | Chou |
| 2010/0034163 | A1 | 2/2010 | Damnjanovic et al. |
| 2010/0035625 | A1 | 2/2010 | Damnjanovic et al. |
| 2010/0118817 | A1 | 5/2010 | Damnjanovic et al. |
| 2010/0135272 | A1 | 6/2010 | Dayal et al. |
| 2010/0232373 | A1 | 9/2010 | Nory et al. |
| 2010/0232382 | A1 | 9/2010 | Gauvreau et al. |
| 2010/0234037 | A1 | 9/2010 | Terry et al. |
| 2010/0272048 | A1 | 10/2010 | Pan et al. |
| 2011/0002309 | A1 | 1/2011 | Park et al. |
| 2011/0065453 | A1 * | 3/2011 | Baldemair ............ G01S 5/0009 455/456.1 |
| 2011/0141926 | A1 * | 6/2011 | Damnjanovic ....... H04L 1/0026 370/252 |
| 2011/0141941 | A1 * | 6/2011 | Lee ............... H04L 1/0038 370/252 |
| 2011/0205996 | A1 | 8/2011 | Kim et al. |
| 2011/0292900 | A1 | 12/2011 | Ahn et al. |
| 2012/0014329 | A1 * | 1/2012 | Kwon ............... H04L 1/1607 370/328 |
| 2012/0093104 | A1 | 4/2012 | Tiirola et al. |

FOREIGN PATENT DOCUMENTS

| | | |
|---|---|---|
| WO | 09/033280 | 3/2009 |
| WO | 09/041779 | 4/2009 |

OTHER PUBLICATIONS

Huawei, "PUCCH design for carrier aggregation," 3GPP TSG RAN WG1 Meeting #57, R1-091810, San Francisco, USA (May 4-8, 2009).
Huawei, "PUCCH design for carrier aggregation," 3GPP TSG RAN WG1 Meeting #58, R1-093046, Shenzhen, China, (Aug. 24-28, 2009).
Institute of Electrical and Electronics Engineers, "Draft Amendment to IEEE Standard for Local and Metropolitan Area Networks, Part 16: Air Interface for Broadband Wireless Access Systems, Advance Air Interface," P802.16m/D1, Jul. 2009.
Institute of Electrical and Electronics Engineers, "IEEE Standard for Local and Metropolitan Area Networks, Part 16: Air Interface for Broadband Wireless Access Systems," IEEE Std. 802.16/2009, May 2009.
Mitsubishi Electric, "On the ACK/NACK signalling in PUCCH for LTE-Advanced," 3GPP TSG RAN WG1 #58, Tdoc R1-093151, Shenzhen, China (Aug. 24-28, 2009).
Motorola, "Control Channel Design Issues for Carrier Aggregation in LTE-A," 3GPP TSG RAN1#55bis, R1-090268, Ljubljana, Slovenia (Jan. 12-16, 2009).
Motorola, "Uplink Control Signalling Design for Carrier Aggregation," 3GPP TSG RAN1#57, R1-092172, San Francisco, USA (May 4-8, 2009).
Panasonic, "UL ACK/NACK transmission on PUCCH for carrier aggregation," 3GPP TSG-RAN WG1 Meeting #57bis R1-092535, 3GPP, (Jun. 29, 2009).
Srinivasan et al., "IEEE 802.16m System Description Document (SDD)," IEEE 802.16 Broadband Wireless Access Working Group, IEEE 802.16m-09/0034, Jul. 2009.
Third Generation Partnership Project, "Technical Specification Group Radio Access Network; Physical layer aspects for evolved Universal Terrestrial Radio Access (UTRA) (Release 7)," 3GPP TR 25.814 V7.0.0 (Jun. 2006).
Third Generation Partnership Project, "Technical Specification Group Radio Access Network; Physical layer aspects for evolved Universal Terrestrial Radio Access (UTRA) (Release 7)," 3GPP TR 25.814 v7.1.0 (Sep. 2006).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.9.0 (Jun. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 v9.0.0 (Jun. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 v9.4.0 (Jun. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.0.0 (Jun. 2010).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.6.0 (Jun. 2009).
Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 v9.3.0 (Jun. 2010).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.7.0 (May 2009).

(56) References Cited

OTHER PUBLICATIONS

Third Generation Partnership Project, "Technical Specification Group Radio Access Network; Evolved Universal Terrestrial Radio Access (E-UTRA); Physical Channels and Modulation (Release 9)," 3GPP TS 36.211 v9.1.0 (Mar. 2010).

Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).

Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.6.0 (Jun. 2009).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.10.0 (Jun. 2010).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 v9.3.0 (Jun. 2010).

Third Generation Partnership Project, "Technical Specification Group Radio Access Network; Evolved Universal Terrestrial Radio Access (E-UTRA); Physical layer procedures (Release 8)," 3GPP TS 36.213 V8.7.0 (May 2009).

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 9)," 3GPP TS 36.213 v9.2.0 (Jun. 2010).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.7.0 (May 2009).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).

Third Generation Partnership Project, "Technical Specification Group Radio Access Network; Evolved Universal Terrestrial Radio Access (E-UTRA); Multiplexing and channel coding (Release 9)," 3GPP TS 36.212 v9.2.0 (Jun. 2010).

\* cited by examiner

METHOD AND APPARATUS FOR REPORTING FEEDBACK INFORMATION FOR MULTI-CARRIER OPERATION

CROSS REFERENCE TO RELATED APPLICATIONS

This application is a continuation of U.S. patent application Ser. No. 15/042,907 filed Feb. 12, 2016, which is a continuation of U.S. patent application Ser. No. 12/868,214 filed Aug. 25, 2010, which issued as U.S. Pat. No. 9,264,177 on Feb. 16, 2016, which claims the benefit of U.S. Provisional Application No. 61/236,912 filed Aug. 26, 2009, the contents of which are hereby incorporated by reference herein.

BACKGROUND

Multi-carrier operation improves achievable throughput and coverage of wireless access systems. In multi-carrier operation, a wireless transmit/receive unit (WTRU) may be configured and activate more than one frequency carrier in the uplink (UL) and/or in the downlink (DL). The multi-carrier operations would allow UL and DL transmission bandwidths to exceed a single carrier frequency and allow for more flexible and more efficient usage of the available spectrums.

For flexible and efficient usage of the available spectrums and for effective support for the asymmetric traffic loads in the DL, the multi-carrier configuration with an unpaired DL carrier(s) has been proposed. An unpaired DL carrier is a DL carrier that does not have a corresponding UL carrier. For example, in frequency division duplex (FDD) systems, the DL may contain a first 20 MHz carrier and a second 10 MHz carrier and the UL may have a 20 MHz carrier. In this example, the second DL 10 MHz carrier, which does not have a paired UL carrier, is an unpaired DL carrier. The unpaired DL carrier may occur in time division duplex (TDD) systems as well. For example, a subscriber may have a first carrier activated on both the DL and the UL and a second carrier activated only on the DL, where the second carrier with only DL activation is an unpaired DL carrier. Another example of unpaired DL carrier is a partially configured carrier, which is defined as DL-only transmission carrier in TDD or a DL carrier without paired UL carrier in FDD.

SUMMARY

Method and apparatus for reporting feedback information for multi-carrier operation are disclosed. For effective support for the asymmetric traffic loads in the downlink, a wireless transmit/receive unit (WTRU) may be configured with multiple carriers with an unpaired downlink carrier(s). The unpaired downlink carrier is an active downlink carrier that does not have a corresponding active uplink carrier. The WTRU reports feedback information for multi-carrier operation including feedback for the unpaired downlink carrier. For transmission of the feedback information for the unpaired downlink carrier, a feedback channel may be allocated on a distinct non-overlapping resource region on the uplink carrier so that the network may determine which downlink carrier the received feedback information is for based on the resource region. Alternatively, a different feedback channel may be allocated for the unpaired downlink carrier.

The feedback information for the unpaired downlink carrier may be transmitted based on a pre-determined pattern on a feedback channel. The feedback information for the unpaired downlink carrier may be transmitted via a physical control channel. Alternatively, the feedback information may be transmitted via medium access control (MAC) encoded feedback such as MAC signaling header, MAC subheader, MAC extended header, MAC extended subheader, and/or MAC management message.

In another example, a WTRU may receive an allocation message which indicates an allocation of downlink resources for a downlink transmission and an allocation of a first uplink control channel. Further, the indicated allocation of the first uplink control channel may indicate a starting symbol for the first uplink control channel and subcarriers for the first uplink control channel. Also, the WTRU may receive the downlink transmission on a downlink carrier in the indicated allocation of downlink resources for the downlink transmission. Moreover, the WTRU may transmit a plurality of uplink control channels carrying hybrid automatic repeat request (HARQ) acknowledgment/negative-acknowledgement (ACK/NACK) information for the downlink transmission and other control information. In addition, the plurality of uplink control channels may include the first uplink control channel.

In a further example, the WTRU may receive a second downlink transmission on a different downlink carrier and the HARQ ACK/NACK information may include feedback for the second downlink transmission. Moreover, the first uplink control channel may include a channel quality indicator (CQI).

In another example, the plurality of uplink control channels may include a second uplink control channel, which may include the HARQ ACK/NACK information for the downlink transmission. Further, the first uplink control channel and the second uplink control channel may be transmitted in different symbols.

BRIEF DESCRIPTION OF THE DRAWINGS

A more detailed understanding may be had from the following description, given by way of example in conjunction with the accompanying drawings wherein.

DETAILED DESCRIPTION

Figure 1A:
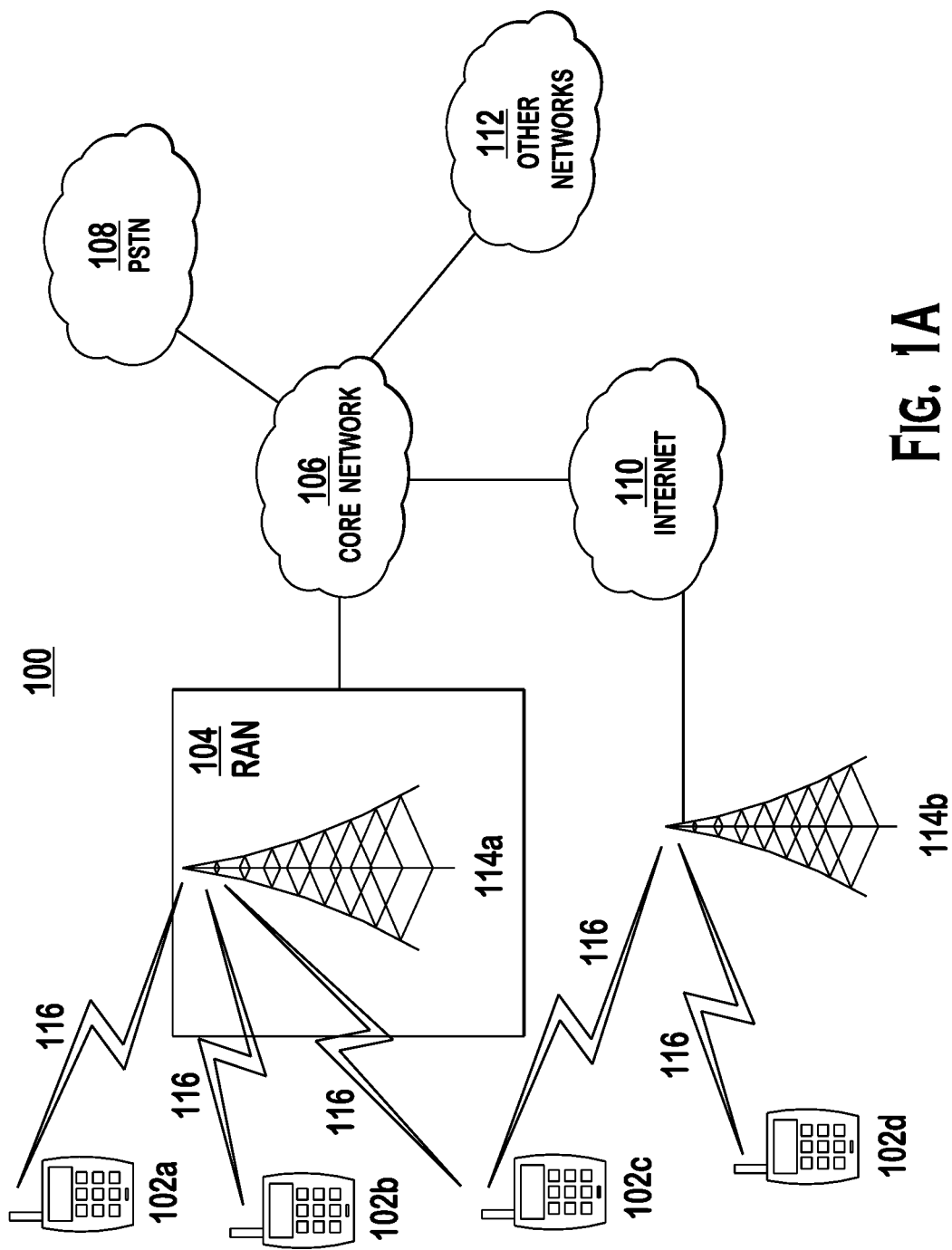
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
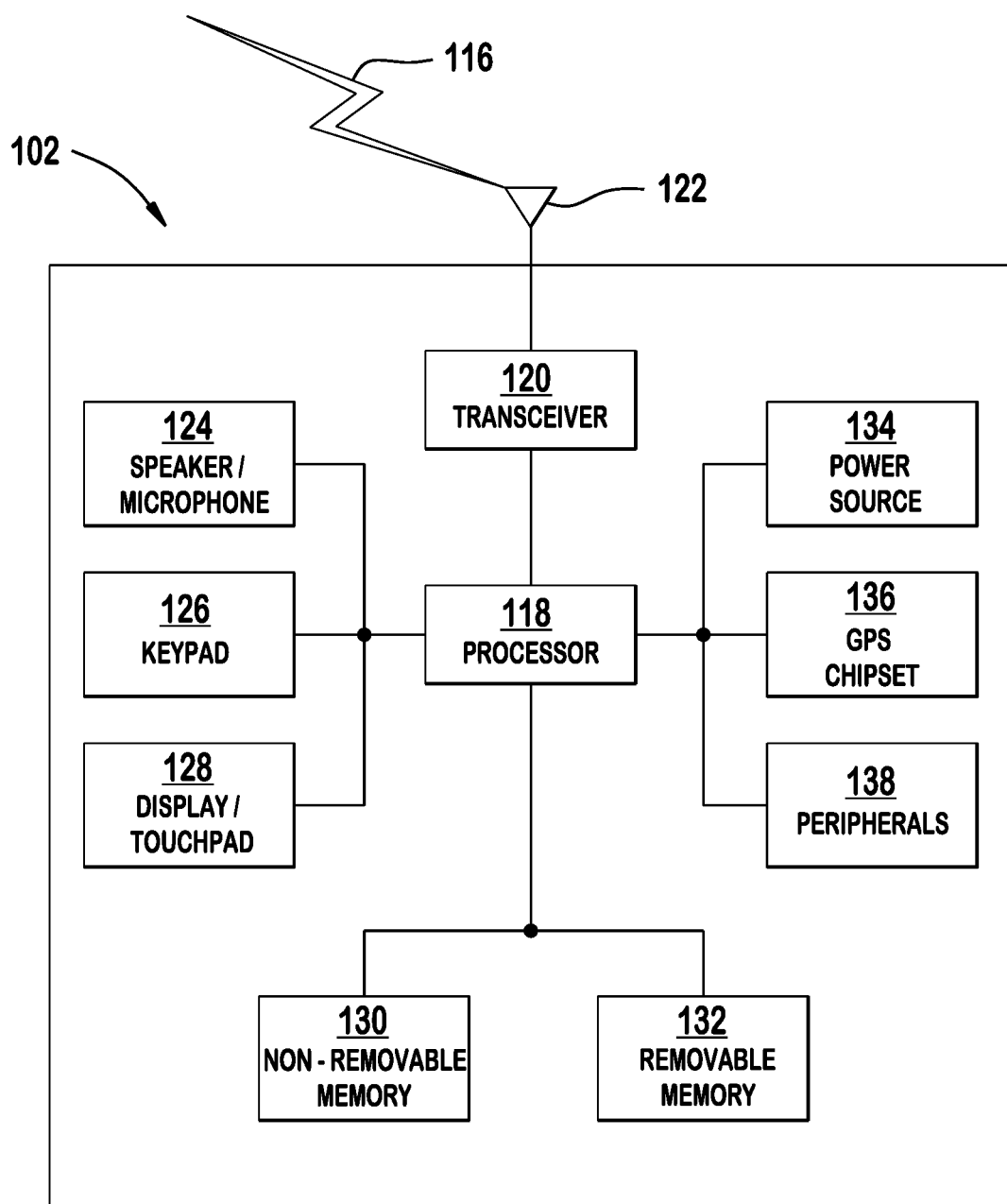
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

The processor 118 is configured to perform, either alone or in combination with software, the methods in accordance with one or any combination of the embodiments disclosed herein.

Figure 1C:
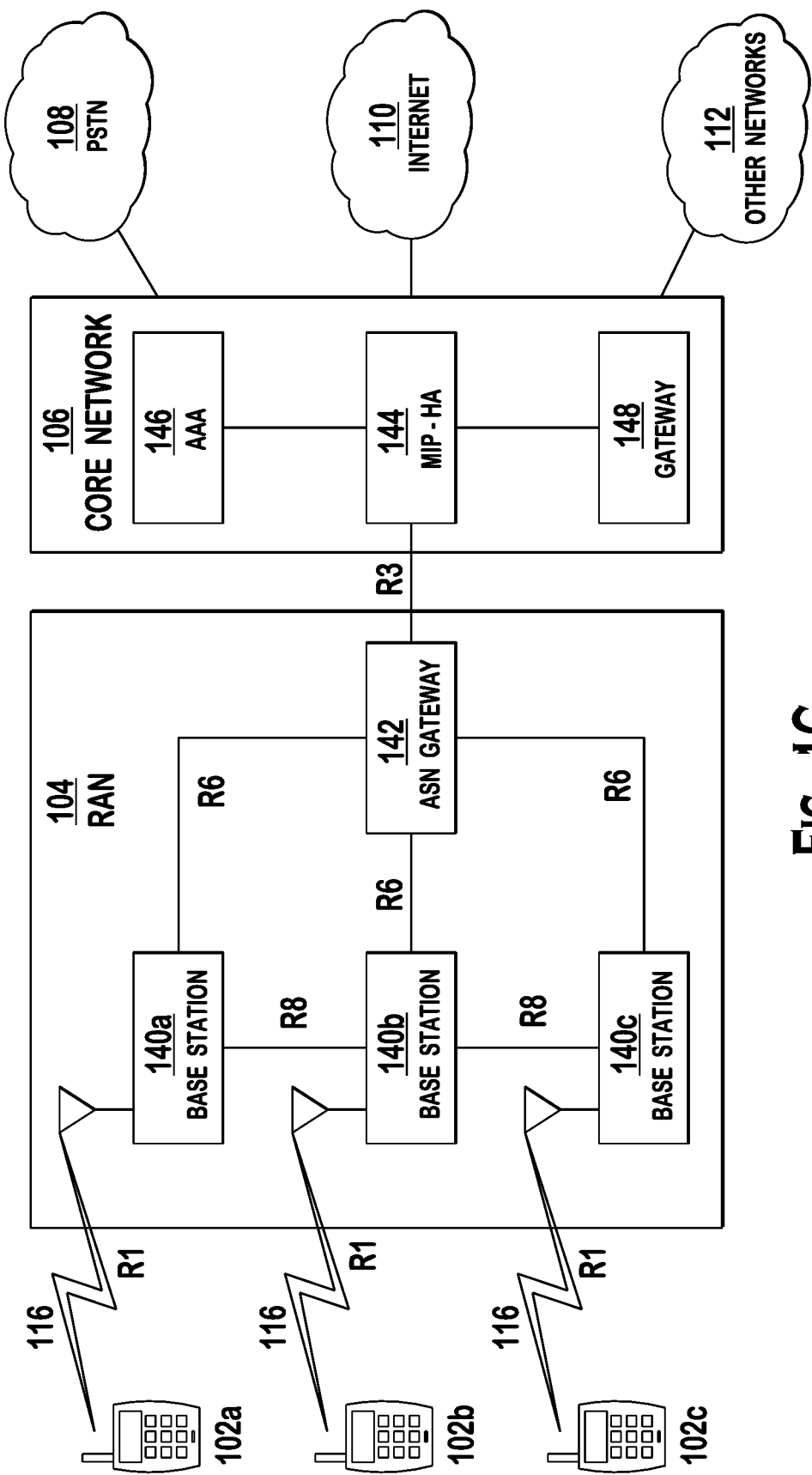
FIG. 1C is a system diagram of an example radio access network and an example core network that may be used within the communications system illustrated in FIG. 1A.

FIG. 1C is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1C, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Figure 2:
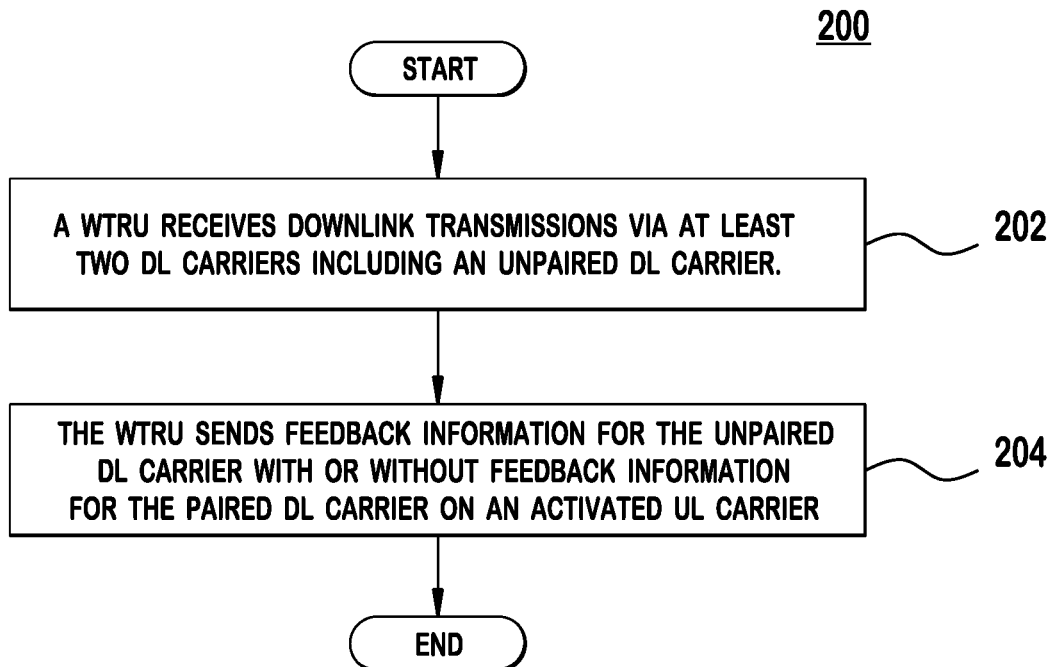
FIG. 2 is a flow diagram of an example process for reporting feedback information for multi-carrier operation.

FIG. 2 is a flow diagram of an example process for reporting feedback information for multi-carrier operation. A WTRU is configured, and activated, a plurality of DL carriers and at least one uplink carrier either in FDD, TDD, or half duplex FDD mode. The WTRU receives downlink transmissions via at least two DL carriers including an unpaired DL carrier (202). The unpaired DL carrier is an active DL carrier that does not have a corresponding active UL carrier.

The WTRU then sends feedback information for the unpaired DL carrier with or without feedback information for the paired DL carrier on an activated UL carrier (204). For the multi-carrier DL operation, the WTRU needs to transmit feedback information in the UL to the base station (or any other network entity) for both a paired DL carrier and an unpaired DL carrier. The feedback information may include DL physical layer (PHY) measurement such as carrier-to-interference and noise ratio (CINR), MIMO operation related feedback information, hybrid automatic repeat request (HARQ) positive acknowledgement/negative acknowledgement (ACK/NACK) feedback, the subscriber's suggestion about the DL operation, (e.g., subscriber preferred DL modulation and coding schemes, etc.), or any other information.

The DL carrier with which the feedback information is associated may be implicitly or explicitly indicated, which will be explained in detail below. The activated UL carrier may be a primary UL carrier or a secondary UL carrier.

The feedback information may be sent via a physical control channel, (e.g., fast feedback channel, channel quality indication channel (CQICH), HARQ ACK/NAK channel, and the like as specified in IEEE 802.16m), or via medium access control (MAC) encoded feedbacks, (e.g., MAC signaling header, extended header, subheader, extended subheader, and MAC management messages, and the like), or any other messaging mechanism that may be implemented at different protocol layers.

Embodiments for sending feedback information for the unpaired DL carrier and identifying the DL carrier for the transmitted feedback information are explained hereafter. It should be noted that even though the embodiments will be explained with reference to an IEEE 802.16m system using the terminologies and types of channels and messages specific to IEEE 802.16m, the embodiments are also applicable to any type of wireless communication systems including, but not limited to, the third generation partnership project (3GPP) LTE or LTE-Advanced.

In accordance with one embodiment, the feedback information for the unpaired DL carrier(s) (with or without feedback information for the paired DL carrier(s)) may be reported via a physical control channel on an activated UL carrier. For example, the physical control channel in 802.16m may be a fast feedback channel (i.e., a channel quality indication channel (CQICH)), a HARQ channel, or the like. The activated UL carrier through which the feedback information is transmitted may be a primary UL carrier or an activated secondary UL carrier. The feedback information may be information about any DL carriers, including activated paired or unpaired DL carriers.

The DL carrier to which the transmitted feedback information is related may be identified by a DL carrier identifier (or any equivalent thereof) which is implicitly or explicitly coded in the feedback information. Alternatively, the DL carrier may be identified implicitly by the feedback allocation. The feedback allocation may be either at the feedback channel level or at the feedback region level, which will be explained in detail below.

Example embodiments for sending feedback information for the unpaired DL carrier(s) via a physical control channel are explained with reference to 802.16m. In IEEE 802.16m, a primary fast feedback control channel (PFBCH), a secondary fast feedback control channel (SFBCH), or a HARQ feedback control channel (HFBCH) may be used for reporting feedback information.

Each PFBCH carries 6 bits of information providing wideband channel quality feedback, MIMO feedback and the like. The physical resource for the PFBCH is allocated to the WTRU by a feedback allocation advanced map (A-MAP) information element (IE) in the DL. The PFBCH starts at a pre-determined location, (i.e., feedback region), with the size (both subcarrier and OFDM symbol) defined in a DL broadcast control message.

Each SFBCH carries 7 to 24 bits of information providing narrowband channel quality feedback, MIMO feedback, and the like. The physical resource for the SFBCH is allocated to the WTRU by a feedback allocation A-MAP IE. The SFBCH starts at a pre-determined location, (i.e., feedback region), with the size defined in a DL broadcast control message. A feedback region is an UL resource allocation on an activated UL carrier that comprises a plurality of resource units, where a resource unit is the smallest resource allocation granularity. In IEEE 802.16m, a resource unit comprises 18 subcarriers over 6 OFDM symbols.

Each HFBCH carries 1 bit of information providing an ACK or a NACK for a DL HARQ packet. The HFBCH is allocated to the WTRU through the HARQ feedback allocation (HFA) field in the same DL A-MAP IE that specifies the DL allocation for the DL HARQ packet. Such DL A-MAP IEs include DL basic assignment A-MAP IE, DL individual persistent A-MAP IE, DL composite persistent A-MAP IE, and DL group resource allocation A-MAP IE.

The DL carrier identity may be explicitly included in the coded feedback information in the PFBCH or SFBCH. Alternatively, in order to reduce the number of bits for specifically indicating the DL carrier identity, a compression scheme may be implemented. For example, the base station may signal a list of its component carriers and the WTRU may use the component carrier index into the list as a substitute for the DL carrier identifier. If the number of carriers for any cells is not very large, 2-3 bits may be sufficient.

Alternatively, the DL carrier identity may be indicated implicitly by modifying the physical layer signals in a way that allows the base station to determine to which DL carrier the feedback information is related.

In accordance with one embodiment, a pilot sequence may be modified to indicate the DL carrier identity with which the feedback information is associated. In IEEE 802.16m, the SFBCH comprises three (3) distributed feedback mini-tiles (FMTs) and each FMT includes two pilot symbols (i.e., six pilot symbols per SFBCH). The pilot sequence in the SFBCH may be [1 1 1 1 1 1]. In accordance with one embodiment, the pilot sequence may be modified to create other pilot sequences which correspond to other DL carrier identifiers (i.e., a different pilot sequence may be used for feedback information for a different DL carrier). The pilot sequences may or may not be orthogonal to each other. The base station compares the received pilot sequence in the SFBCH to all possible sequences to determine which DL carrier identifier corresponds to the transmitted feedback information on the SFBCH. Alternatively, the receiver may attempt to decode the data using each possible pilot sequence to check data validity (using a CRC). The carrier identifier may be used as a CRC mask on the data. In this case, each possible mask is used at the receiver until the CRC passes to determine which carrier identifier was used at the transmitter to mask the CRC.

Figure 3:
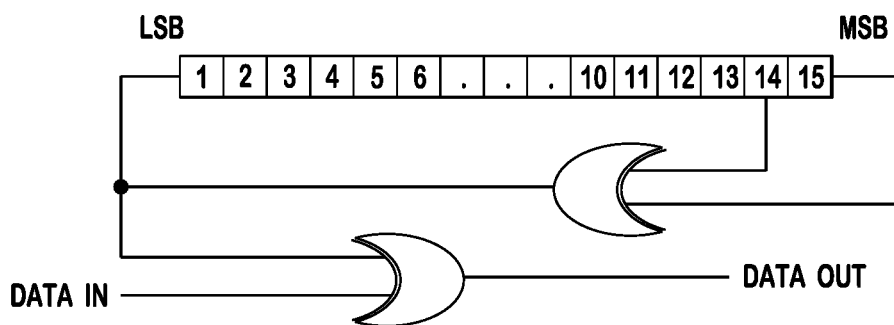
FIG. 3 shows a conventional data randomizer.

In IEEE 802.16m, data randomization is performed on each burst of data using a data randomizer shown in FIG. 3. As shown in FIG. 3 the input bit stream is mixed with a bit sequence generated by the randomizer. The data randomization is performed for preventing long sequences of ones or zeros. The randomizer is initialized with a predetermined sequence. In accordance with another embodiment, the randomizer initialization sequence may be selected depending on the downlink carrier to which the feedback information is related to so as to indicate which DL carrier identifier the current feedback information is related to, (i.e., the randomizer may be initialized with a different sequence for feedback information for a different DL carrier).

Figure 4:
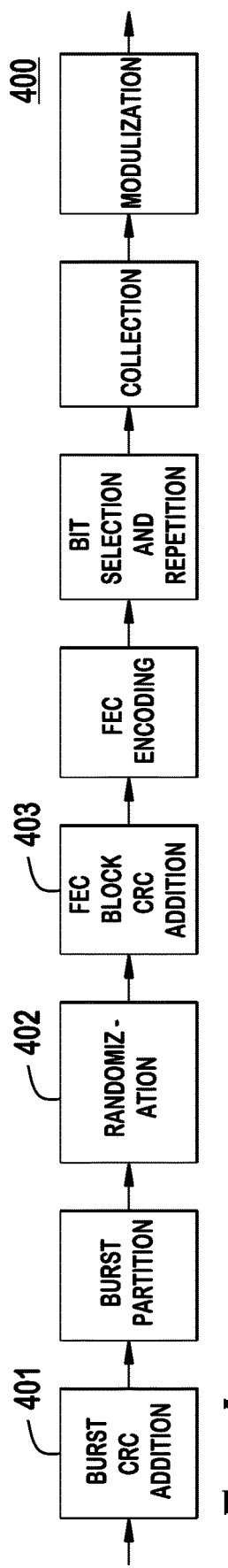
FIG. 4 shows a coding chain 400 at a transmitting side.

FIG. 4 shows a coding chain 400 at a transmitting side. When a randomizer 402 is loaded with a sequence based on the DL carrier identifier, the randomizer 402 produces a randomized stream that is unique to the data and the pre-loaded sequence. A CRC is added to the output of the randomizer 402 by the FEC block CRC addition block 403. The data input to the randomizer 402 also has a (burst) CRC added by the burst CRC addition block 401. At the receiver, the FEC block may be verified by CRC check, and then different randomizer preload sequences may be tried until the burst CRC check passes, which will provide the DL carrier identifier.

To determine which DL carrier identifier is being referenced, the base station may try each of the predetermined preloaded sequences for the randomizer.

In accordance with another embodiment, the DL carrier may be implicitly indicated based on the feedback allocation. Two levels of feedback allocations are available for this purpose: feedback channel level and feedback region level.

One or more feedback channels may be formed in a resource unit depending on the feedback channel structure. Multiple feedback channels may be allocated to one feedback region. In IEEE 802.16m, the UL fast feedback channels, including both PFBCH and SFBCH, are allocated or de-allocated to the WTRUs by the feedback allocation A-MAP IE. Table 1 shows the basic structure of the 802.16m feedback allocation A-MAP IE.

TABLE 1

| Syntax | Size (bit) | Notes |
|---|---|---|
| Feedback-Allocation-A-MAP_IE( ) { | | |
| A-MAP IE Type | 4 | Type for the feedback allocation A-MAP IE |
| Channel Index | Variable | Feedback channel index within the UL fast feedback control resource region, dependent on the size of feedback control resource region. |
| Short-term feedback period (p) | 3 | A feedback is transmitted on the FBCH every $2^p$ frames |
| Long-term feedback Period (q) | 2 | A long-term feedback is transmitted on the FBCH every $2^q$ short-term feedback opportunities. If q = 0b00, long-term feedback is not used |
| Frame offset | 3 | The WTRU starts reporting at the frame of which the number has the same 3 LSB as the specified frame offset. If the current frame is specified, the WTRU may start reporting in eight frames. |
| ............... <Other fields > | ... | Other fields, specifying the feedback channel, e.g., feedback format, MIMO mode, . . . |
| MCRC | 16 | 16 bit CRC masked by Station ID |
| } | | |

A "DL carrier identifier" field may be added to the feedback allocation A-MAP IE to indicate the DL carrier for which the feedback channel is allocated so that a separate feedback channel may be allocated for each DL carrier. Alternatively, the DL carrier identifier may be used as a part of the mask for the CRC. In 802.16m, the CRC field is masked with a station ID (STID). The STID is 12 bits long and the CRC field is 16 bits long. Therefore, the remaining 4 bits of CRC may be masked with a masking code that contains the DL carrier identity information to indicate which DL carrier the feedback channel allocation is for.

Multiple feedback channels may be allocated to a WTRU, and the WTRU may send the feedback information for a specific DL carrier in the corresponding feedback channel so that the base station recognizes which DL carrier the received feedback information is for based on the feedback channel on which the feedback information is received. The feedback channels may be allocated to a WTRU either by using the feedback allocation A-MAP IE multiple times or by using a modified version of the feedback allocation A-MAP IE to allocate multiple feedback channels to the same WTRU.

Figure 5:
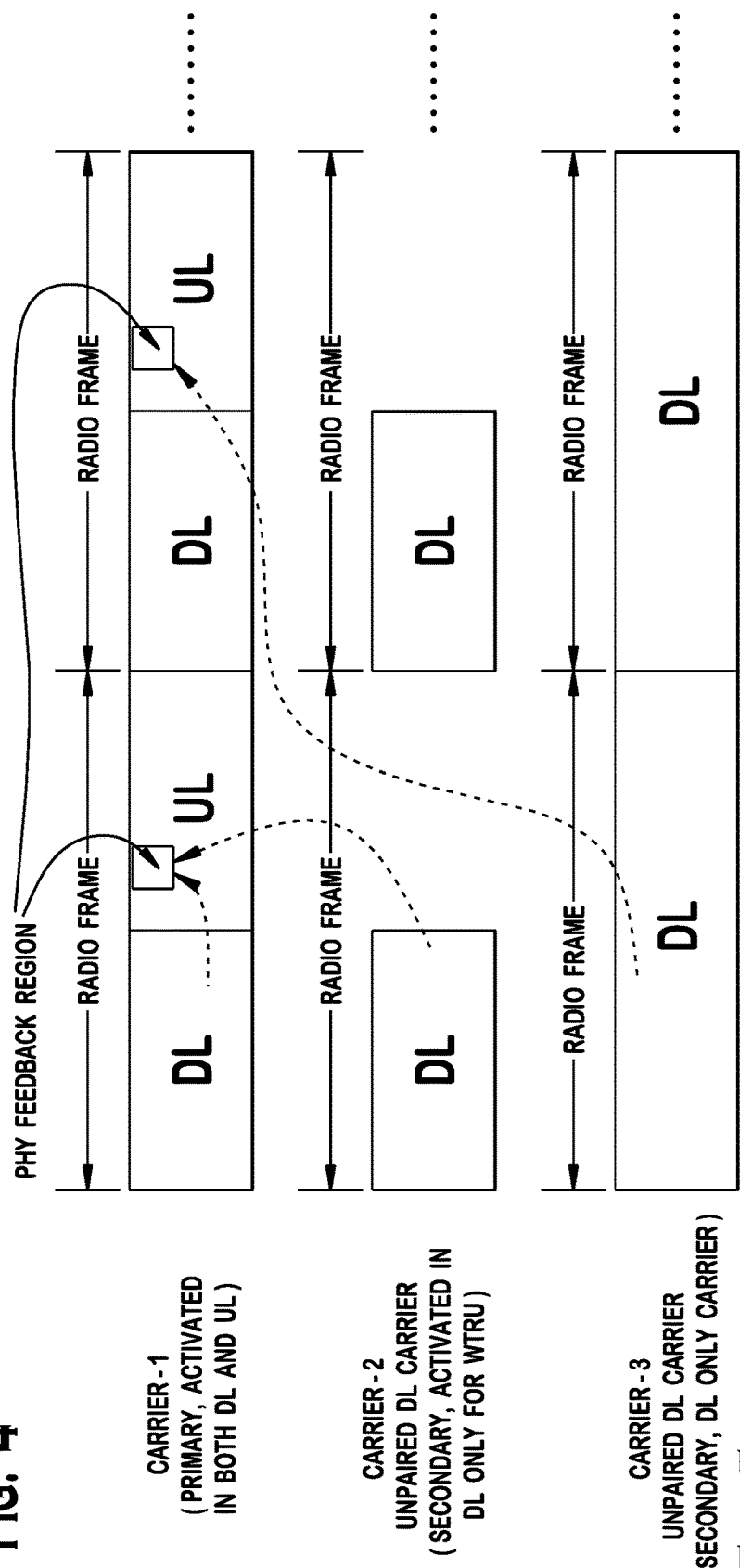
FIG. 5 shows an example scheme for indicating the DL carrier using feedback channel allocation.

FIG. 5 shows an example scheme for indicating the DL carrier using feedback channel allocation. In FIG. 5, a WTRU has three activated carriers, Carrier-1, Carrier-2, and Carrier-3. Carrier-1 is activated in both DL and UL, Carrier-2 is activated only in DL, and Carrier-3 is a DL-only carrier. Carrier-2 and Carrier-3 are unpaired DL carriers. In FIG. 5, multiple feedback channels are allocated to the WTRU in the feedback region of the UL carrier, and the WTRU sends the feedback for Carrier-1, Carrier-2 and Carrier-3 on the corresponding allocated feedback channel, respectively.

Alternatively, the DL carrier information may be implicitly indicated through mapping the feedback channels to the DL carriers, instead of explicitly using a field of DL carrier identifier in the feedback allocation IE. Multiple feedback channels may be allocated to a WTRU either by using the conventional feedback allocation A-MAP IE multiple times or by using a modified version of the feedback allocation A-MAP IE to allocate multiple feedback channels to the same WTRU. The allocated feedback channels may have a one-to-one correspondence with the DL carriers. This correspondence may be either specified by MAC signaling during the multiple carrier operation initialization for the WTRU or by a pre-defined mapping scheme. For example, the lowest channel index of the feedback channel may be assigned for the feedback of the default DL carrier, and the remaining feedback channels may be mapped to the unpaired DL carriers in the same order of feedback channel index as the carrier index.

Figure 6:
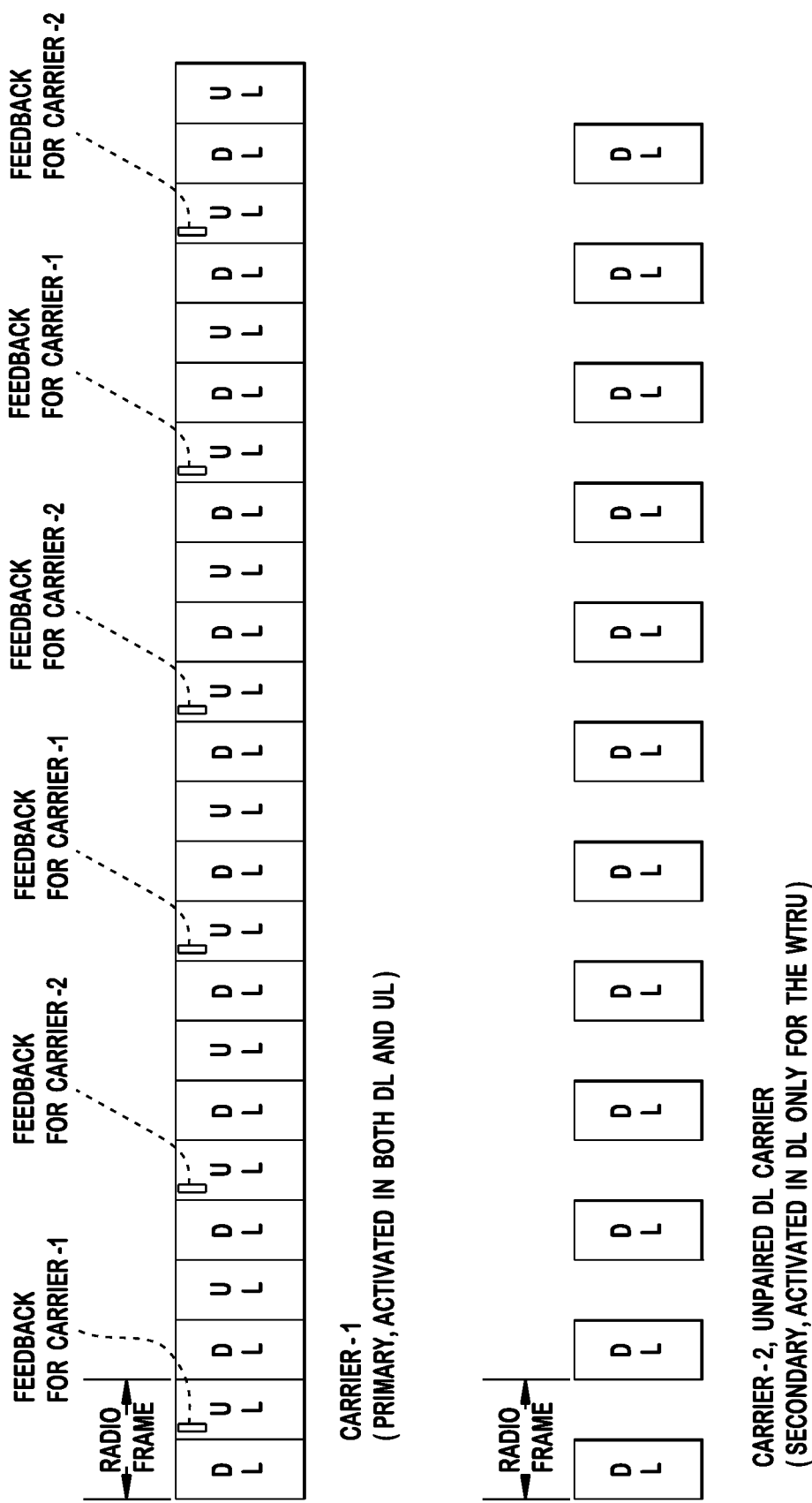
FIG. 6 shows an example scheme for indicating the DL carrier using feedback channel usage pattern.

Alternatively, one feedback channel may be assigned to a WTRU and multiple DL carriers may share the single feedback channel in time domain, and a pre-agreed feedback channel usage pattern may be defined between the base station and the WTRU. The feedback usage pattern implicitly indicates the DL carrier information for feedback sent on the feedback channel at a specific time. FIG. 6 shows an example scheme for indicating the DL carrier using feedback channel usage pattern. In FIG. 6, a WTRU has two activated carriers, Carrier-1 and Carrier-2. Carrier-1 is activated in both DL and UL, and Carrier-2 is activated only in DL. Carrier-2 is an unpaired DL carrier. In FIG. 6, a feedback channel is allocated to the WTRU periodically in every two frames. The WTRU and the base station have a pre-agreed feedback channel usage pattern for sending feedback for multiple DL carriers. For example, the WTRU may send the feedback for the DL carriers in a round robin fashion, (i.e., Carrier-1, Carrier-2, Carrier-1, Carrier-2, Carrier-1, . . . ). The feedback channel usage pattern may be pre-determined or specified in a standard specification or negotiated between the base station and the WTRU, (e.g., during the multicarrier operation initialization process).

Alternatively, a separate feedback region may be allocated for a different DL carrier, and all the feedback channels for the DL carrier may be allocated to the WTRUs in the corresponding feedback region. In IEEE 802.16m, a feedback region is allocated in a pre-determined location with the size specified in DL control signals, (e.g., the SuperFrame Header (SFH)). The base station may allocate a separate feedback region, (i.e., a distinct non-overlapping region), for each DL carrier, including paired and unpaired DL carriers. The location and size of the feedback control region for an unpaired DL carrier may be specified in DL control signals, (e.g., SuperFrame Header, or in MAC management messages). Separate feedback regions may be allocated in time domain and/or frequency domain.

Figure 7:
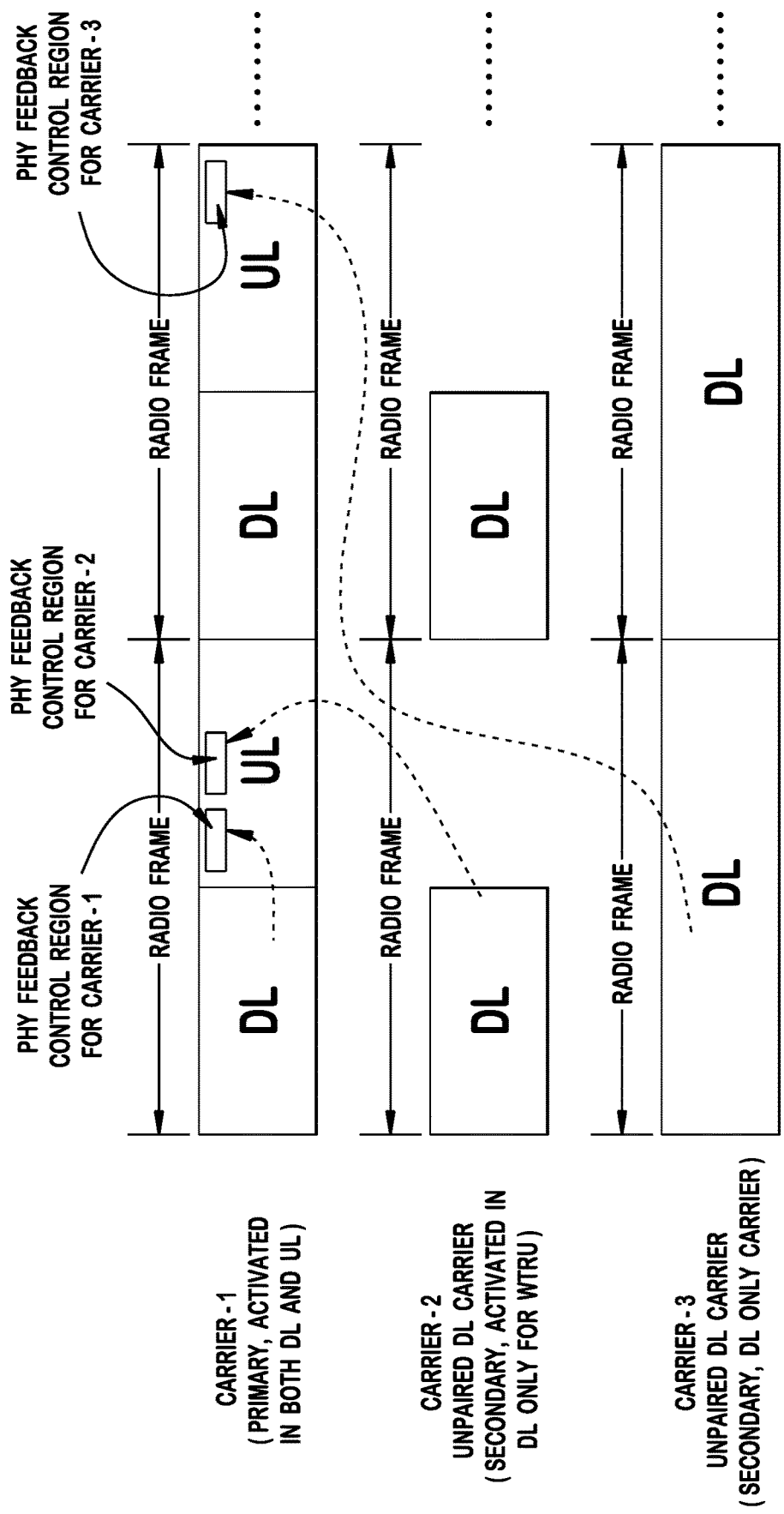
FIG. 7 shows an example scheme for supporting feedback for unpaired DL carrier with feedback region level allocation.

FIG. 7 shows an example scheme for supporting feedback for unpaired DL carrier with feedback region level allocation. In FIG. 7, a WTRU has three activated carriers, Carrier-1, Carrier-2, and Carrier-3. Carrier-1 is activated in both DL and UL, Carrier-2 is activated only in DL, and Carrier-3 is DL-only carrier. Carrier-2 and Carrier-3 are unpaired DL carriers. In FIG. 7, three separate feedback regions are allocated to the WTRU for Carrier-1, Carrier-2, and Carrier-3, the WTRU sends the feedback of the DL carriers on the allocated feedback channel on the corresponding allocated feedback region.

The embodiments disclosed above may be used for sending HARQ ACK/NACK feedback, as well. HARQ ACK/NACK feedback is different from the DL channel feedback in the following aspects. HARQ ACK/NACK is per HARQ packet while DL channel feedback is per WTRU per DL channel. HARQ ACK/NACK usually carries 1-bit information while DL channel feedback requires more information bits. HARQ ACK/NACK allocation to a HARQ packet is usually specified in conjunction with the HARQ packet allocation implicitly or explicitly while DL channel feedback is usually specified by a feedback channel allocation IE, and the feedback channel allocation to a subscriber may be periodic.

In transmission of HARQ ACK/NACK for unpaired DL carriers, the DL carrier information may be provided implicitly or explicitly in the HARQ ACK/NAK allocation either at the ACK/NACK channel level or at the ACK/NACK region level. A separate HARQ ACK/NACK channel may be allocated for each DL carrier and an HARQ feedback for the unpaired DL carrier may be sent via the corresponding HARQ channel. Alternatively, a separate HARQ region may be allocated for each DL carrier and HARQ feedback for the unpaired DL carrier may be sent via a channel allocated in the corresponding HARQ region.

The information about the UL carrier that carries the HARQ ACK/NACK for an unpaired DL carrier and the HARQ ACK/NACK region allocation may be either predetermined, (e.g., the primary UL carrier and a known location), or signaled by DL PHY control signaling or MAC control message.

Alternatively, multiple HARQ ACK/NACKs may be aggregated, (i.e., one HARQ feedback is transmitted for multiple packets). With aggregated ACK/NACK, the HARQ feedback of two or more HARQ packets is logical ANDed together such that an ACK is generated if all packets have been decoded successfully and a NACK is generated if at least one packet is not successfully decoded. Upon receipt of an NACK, the base station re-transmits all relevant packets. This scheme may save uplink resources at the cost of occasional redundant downlink retransmissions.

In accordance with another embodiment, the feedback information for the unpaired DL carrier (with or without feedback information for the paired DL carrier(s)) may be reported via the MAC encoded feedback, (e.g., in MAC signal headers, subheaders, extended headers, or extended subheaders, or MAC management messages, etc.), on an activated UL carrier. The activated UL carrier may be the primary UL carrier or an activated secondary UL carrier. The MAC encoded feedback may contain the feedback information for DL carriers, including activated paired or unpaired DL carriers. The DL carrier for specific feedback information transmitted in the MAC encoded header, subheader, extended header, or messages may be identified by its DL carrier identifier provided in the MAC encoded feedback information or by a cyclic redundancy check (CRC) that is masked by the DL carrier identifier or its equivalent.

In order to minimize the MAC management or control overhead, the MAC encoded feedback for supporting unpaired DL carriers may selectively include some of the feedback information. For example, the DL carrier identifier may not be included in the MAC encoded feedback when the feedback is for the default DL carrier, where the default DL carrier is the corresponding DL carrier of the UL carrier where the feedback is transmitted. Another example is the MAC encoded feedback may not include the feedback information for the paired DL carries under the consideration that the fast feedback channels for the paired DL carriers provide sufficient feedback information.

Embodiments for providing feedback for unpaired DL carrier through MAC encoded feedback in IEEE 802.16m multicarrier operation are explained hereafter. MAC management messages (report request and report response messages) may be defined for the base station to request a WTRU to provide a DL channel feedback report and for the WTRU to report DL channel feedback to the base station for multi-carrier operation. The report response from the WTRU may be sent either as a response to the request from the base station or in an unsolicited manner. Table 2 shows the 802.16 MAC management message format.

TABLE 2

| Syntax | Size (bit) | Notes |
|---|---|---|
| MAC Management Message( ) { | | |
| Generic MAC Header (GMH) | 16 | Generic MAC header, including the information fields of the Flow ID for MAC management flow and the length of the MAC management message |
| Type | 8 | MAC management message type. |
| Contents | variable | MAC management message contents. |
| } | | |

In order to support the multicarrier operations with unpaired DL carrier configurations and allow a single report request and report response message to request and report feedbacks for multiple DL carries for MAC control efficiency, the DL carrier information may be included in the report request or report response messages. Table 3 and Table 4 show examples of the report request and report response messages with DL carrier information, respectively. In Tables 3 and 4, two 1-bit indicators are used to indicate the inclusions of the default DL carrier and/or non-default DL carrier. The default DL carrier is the DL carrier paired with the UL carrier where the report response will be transmitted.

In the report request message in Table 3, the indicator "Default-DL-carrier-report-request-included" indicates whether this report request message includes the report request for the default DL carrier, and the indicator "Non-default-DL-carrier-report-request-included" indicates whether this report request includes the report requests for the non-default DL carrier. The report request includes the "DL carrier index" field indicating the DL carrier for the requested content.

TABLE 3

| Syntax | Size (bit) | Notes |
|---|---|---|
| MAC Management Message( ) { | | |
| Generic MAC Header (GMH) | 16 | Generic MAC header, including the information fields of the Flow ID for MAC management flow and the length of the MAC management message |
| Type | 8 | MAC management message type for AAI_REP-REQ |
| Default-DL-carrier-report-request-included | 1 | Indicates if this AAI_REP-REQ includes the report request for the default DL carrier, where the default DL carrier is the DL carrier paired with the UL carrier where the corresponding AAI_REP-RSP will be transmitted; |

TABLE 3-continued

| Syntax | Size (bit) | Notes |
|---|---|---|
| | | 0: not included |
| | | 1: included |
| Non-default-DL-carrier-report-request-included | 1 | Indicated if this AAI_REP-REQ includes the report requests for the non-default DL carrier, |
| | | 0: not included |
| | | 1: included |
| If (Default-DL-carrier-report-request-included) { | | |
|     Report Request content | TBD | Report request content for the default DL carrier |
| } | | |
| If (Non-default-DL-carrier-report-request-included) { | | |
|     Number of DL Carriers (n) | N | The number of DL carriers that this AAI_REP-REQ message requests the WTRU to report. |
|     For (i=0; i<n; i++) { | | |
|         DL carrier index | N | The DL carrier index of the DL carrier that the Report Request content is about. |
|         Report Request content | TBD | Report request content for the i-th DL carrier |
|     } | | |
| } | | |
| } | | |

In the report response message in Table 4, the indicators "Default-DL-carrier-report-included" and "Non-default-DL-carrier-report-included" indicate whether the report for the default DL carrier and the report for the non-default DL carrier are included in this report response message, respectively. The report response message may include the "DL carrier index" field indicating the DL carrier for the report content.

The report request and report response messages may be used to report the non-default DL carrier(s), which would be useful when there is a fast feedback channel allocated in the UL for the default DL carrier. Alternatively, the report request and report response messages may be used to report the default DL carrier, which would be useful when paired DL carriers are required to have feedback information. When more than one non-default DL carriers are included in the report response, a list of DL carrier identifiers and the corresponding report contents may be included in the report response message.

Alternatively, a MAC feedback signaling header may be used for report request and report response for the channel feedback of the unpaired DL carrier. Table 5 shows the basic format of the 802.16m MAC signaling headers. No payload follows the MAC signaling header. The MAC signaling header includes bits for the signaling header contents.

TABLE 4

| Syntax | Size (bit) | Notes |
|---|---|---|
| MAC Management Message( ) { | | |
| Generic MAC Header (GMH) | 16 | Generic MAC header, including the information fields of the Flow ID for MAC management flow and the length of the MAC management message |
| Type | 8 | MAC management message type for AAI_REP-RSP |
| Default-DL-carrier-report-included | 1 | Indicates if this AAI_REP-RSP includes the report for the default DL carrier, where the default DL carrier is the DL carrier paired with the UL carrier where the AAI_REP-RSP is transmitted; |
| | | 0: not included |
| | | 1: included |
| Non-default-DL-carrier-report-included | 1 | Indicated if this AAI_REP-RSP includes the report for the non-default DL carrier, |
| | | 0: not included |
| | | 1: included |
| If (Default-DL-carrier-report-included) { | | |
|     Report content | TBD | Report content for the default DL carrier |
| } | | |
| If (Non-default-DL-carrier-report-included) { | | |
|     Number of reported DL Carriers (n) | N | The number of DL carriers that this AAI_REP-RSP message contains the WTRU' reports. |
|     For (i=0; i<n; i++) { | | |
|         DL carrier index | N | The DL carrier index of the DL carrier that the Report content is about. |
|         Report content | TBD | Report content for the i-th DL carrier |
|     } | | |
| } | | |
| } | | |

TABLE 5

| Syntax | Size (bit) | Notes |
| --- | --- | --- |
| MAC Signaling Header( ) { | | |
| FID | 4 | Flow Identifier. Set to 0001 |
| Type | 4 | MAC signaling header type. |
| Length | 3 | Indicates the length of the signaling header (includes the FID, Type, Length, reserved field and contents):<br>0b000 and 0b001: reserved<br>0b010: 2 bytes<br>0b011: 3 bytes<br>0b100: 4 bytes<br>0b101: 5 bytes<br>0b110: 6 bytes<br>0b111: reserved |
| Contents | variable; 36≤ | MAC signaling header contents, with the size indicated by the length field.<br>The size in bits is Length*8-12 |
| } | | |

Table 6 shows an example 802.16m MAC signaling header that may be used by the WTRU to provide the base station with the feedback for the DL multi-carriers ("Feedback-content" field in Table 6). A "DL-carrier-index" field is used to indicate the DL carrier associated with the feedback.

TABLE 6

| Syntax | Size(bit) | Notes |
| --- | --- | --- |
| Feedback Signaling Header ( ) { | | |
| FID | 4 | Flow Identifier. This field indicates MAC signaling header. |
| Type | 4 | MAC signaling header type for the Feedback signaling header |
| STID | 12 | STID of the WTRU which sends the feedback. |
| DL-carrier-index | N | DL carrier index of the DL carrier which this feedback is about. |
| Feedback-content | 22 | The feedback parameter values. |
| } | | |

The "station identity" (STID) field may not be needed when the MAC signaling header is transmitted in the UL allocation assigned specifically to the WTRU, and the "DL carrier index" field may not be needed when the feedback is for the paired DL carrier of the UL carrier where the feedback is transmitted. In such cases, the STID and the DL carrier index may not be included in the MAC signaling header, respectively. In order to indicate the existence of the STID and the DL carrier index, special flags (STID-inclusion-flag and DL-carrier-index-inclusion-flag) may be included in the MAC signaling header, respectively. Table 7 shows an example MAC signaling header with the STID-inclusion-flag and DL-carrier-index-inclusion-flag.

TABLE 7

| Syntax | Size(bit) | Notes |
| --- | --- | --- |
| Feedback Signaling Header ( ) { | | |
| FID | 4 | Flow Identifier. This field indicates MAC signaling header. |
| Type | 4 | MAC signaling header type for the Feedback signaling header |
| STID-inclusion-flag | 1 | Indicate if the STID is included in this signaling header<br>0: not included<br>1: included |
| DL-carrier-Index-inclusion-flag | 1 | Indicate if the DL carrier index is included in this signaling header:<br>0: not included<br>1: included |
| If STID-inclusion-flag { | | |
| STID | 12 | STID of the WTRU which requests UL bandwidth. |
| } | | |
| If DL-carrier-index-inclusion-flag { | | |
| DL-carrier-index | N | DL carrier index of the DL carrier which this feedback is about. |
| } | | |
| Feedback-content | variable | The feedback parameter values. The size could be 20 bits, 26 bits, or 38 bits, depending on the STD ID inclusion and/or DL carrier Index inclusion. |
| Reserved | TBD | Reserved. This field may be filled by 0 |
| } | | |

The DL CINR report may be piggybacked in the MAC Bandwidth Request signaling header without STID field. Table 8 shows an example of the piggybacked CINR report in the Bandwidth Request signaling header without STID. In Table 8, two fields, ("DL carrier index" and "CINR"), are added to the Bandwidth Request signaling header. The "DL carrier index" field indicates the DL carrier for which the included CINR is, and the "CINR" field indicates the CINR measured by the WTRU.

TABLE 8

| Syntax | Size (bit) | Notes |
|---|---|---|
| BR without STID with CINR report header( ) { | | |
| FID | 4 | Flow Identifier. This field indicates MAC signaling header |
| Type | 4 | MAC signaling header type. |
| BR Type | 1 | Indicates whether the requested bandwidth is incremental or aggregate. 0: incremental 1: aggregate |
| BR Size | 19 | Bandwidth request size in bytes. |
| BR FID | 4 | The FID for which UL bandwidth is requested. |
| DL carrier index | N | DL carrier index of the DL carrier whose CINR is reported below. |
| CINR | 7 | indicates the CINR measured by the WTRU from the ABS. It may be interpreted as a single value from −16.0 dB to 47.5 dB in units of 0.5 dB. |
| Reserved | 3 | Reserved. This field may be filled by 0 |
| } | | |

In 802.16m, the MAC encoded feedback may be included in a MAC extended header. Table 9 shows the basic format of 802.16m MAC extended header.

TABLE 9

| Syntax | Size (bit) | Notes |
|---|---|---|
| MAC extended header ( ) { | | |
| LAST | 1 | Last Extended header indication: 0: one or more extended header follows this extended header unless specified otherwise 1: this is the last extended header unless specified otherwise |
| Type | 8 | MAC extended header type. |
| Body Contents | variable | Extended header type dependent content. |
| } | | |

Table 10 shows an example of a MAC extended header that may be used by the WTRU to provide feedback for the DL carriers. The MAC extended header includes "feedback-content" field for the feedback parameter values, and "DL-carrier-index" field for indicating the DL carrier associated with the feedback.

TABLE 10

| Syntax | Size (bit) | Notes |
|---|---|---|
| MAC extended header ( ) { | | |
| LAST | 1 | Last Extended header indication: 0: one or more extended header follows this extended header unless specified otherwise 1: this is the last extended header unless specified otherwise |
| Type | 8 | MAC extended header type. |
| DL-carrier-index | N | DL carrier index of the DL carrier which this feedback is about. |
| Feedback-content | | The feedback parameter values. |
| } | | |

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a transceiver; and
a processor operatively coupled to the transceiver;
wherein the transceiver is configured to receive an allocation message, wherein the allocation message indicates an allocation of downlink resources for a downlink signal and the allocation message indicates an allocation for a first uplink control channel signal on a first uplink control channel, wherein the indicated allocation for the first uplink control channel signal indicates a starting symbol for the first uplink control channel signal and subcarriers for the first uplink control channel signal;
wherein the transceiver is configured to receive the downlink signal on a downlink carrier in the indicated allocation of downlink resources for the downlink signal; and wherein the transceiver and the processor configured to transmit a plurality of uplink control channel signals on a plurality of uplink control channels carrying hybrid automatic repeat request (HARQ) acknowledgment/negative-acknowledgement (ACK/NACK) information for the downlink signal and other control information, wherein the plurality of uplink control channels includes the first uplink control channel.

2. The WTRU of claim 1, wherein the transceiver and the processor are configured to receive a second downlink signal on a different downlink carrier and the HARQ ACK/NACK information includes feedback for the second downlink signal.

3. The WTRU of claim 1, wherein the first uplink control channel signal includes a channel quality indicator (CQI).

4. The WTRU of claim 1, wherein the plurality of uplink control channel signals includes a second uplink control channel signal, wherein the second uplink control channel signal includes the HARQ ACK/NACK information for the downlink signal.

5. The WTRU of claim 4, wherein the first uplink control channel signal and the second uplink control channel signal are transmitted in different symbols.

6. A method for use in a wireless transmit/receive unit (WTRU), the method comprising:
receiving an allocation message, wherein the allocation message indicates an allocation of downlink resources for a downlink signal and the allocation message indicates an allocation for a first uplink control channel signal on a first uplink control channel, wherein the indicated allocation for the first uplink control channel indicates a starting symbol for the first uplink control channel signal and subcarriers for the first uplink control channel signal;
receiving the downlink signal on a downlink carrier in the indicated allocation of downlink resources for the downlink signal; and
transmitting a plurality of uplink control channel signals on a plurality of uplink control channels carrying hybrid automatic repeat request (HARQ) acknowledgment/negative-acknowledgement (ACK/NACK) information for the downlink signal and other control information, wherein the plurality of uplink control channels includes the first uplink control channel.

7. The method of claim 6, further comprising:
receiving a second downlink signal on a different downlink carrier and the HARQ ACK/NACK information includes feedback for the second downlink signal.

8. The method of claim 6, wherein the first uplink control channel signal includes a channel quality indicator (CQI).

9. The method of claim 6, wherein the plurality of uplink control channel signals includes a second uplink control channel signal, wherein the second uplink control channel signal includes the HARQ ACK/NACK information for the downlink signal.

10. The method of claim 9, wherein the first uplink control channel signal and the second uplink control channel signal are transmitted in different symbols.

11. A base station comprising:
a transceiver; and
a processor operatively coupled to the transceiver;
wherein the transceiver and the processor are configured to transmit an allocation message, wherein the allocation message indicates an allocation of downlink resources for a downlink signal and the allocation message indicates an allocation for a first uplink control channel signal on a first uplink control channel, wherein the indicated allocation for the first uplink control channel signal indicates a starting symbol for the first uplink control channel signal and subcarriers for the first uplink control channel signal;
wherein the transceiver and the processor are configured to transmit the downlink signal on a downlink carrier in the indicated allocation of downlink resources for the downlink signal; and
wherein the transceiver is configured to receive a plurality of uplink control channel signals on a plurality of uplink control channels carrying hybrid automatic repeat request (HARQ) acknowledgment/negative-acknowledgement (ACK/NACK) information for the downlink signal and other control information, wherein the plurality of uplink control channels includes the first uplink control channel.

12. The base station of claim 11, wherein the transceiver and the processor are configured to transmit a second downlink signal on a different downlink carrier and the HARQ ACK/NACK information includes feedback for the second downlink signal.

13. The base station of claim 11, wherein the first uplink control channel signal includes a channel quality indicator (CQI).

14. The base station of claim 11, wherein the plurality of uplink control channel signals includes a second uplink control channel, wherein the second uplink control channel signal includes the HARQ ACK/NACK information for the downlink signal.

15. The base station of claim 14, wherein the first uplink control channel signal and the second uplink control channel signal are received in different symbols.

* * * * *